United States Patent [19]

Shackle

[11] Patent Number: 5,622,791
[45] Date of Patent: Apr. 22, 1997

[54] PHOTOELECTROCHEMICAL CELL

[75] Inventor: Dale R. Shackle, Morgan Hill, Calif.

[73] Assignee: Valence Technology, Inc., Henderson, Nev.

[21] Appl. No.: 519,474

[22] Filed: Aug. 25, 1995

[51] Int. Cl.$^6$ ................................................ H01M 6/36
[52] U.S. Cl. ................................ 429/111; 427/74
[58] Field of Search ............................ 429/111; 427/74

[56] References Cited

U.S. PATENT DOCUMENTS

| | | | |
|---|---|---|---|
| 4,235,955 | 11/1980 | Sammells et al. | 429/111 |
| 4,352,868 | 10/1982 | Skotheim | 429/111 |
| 4,388,385 | 6/1983 | Sekido et al. | 429/111 |
| 4,400,451 | 8/1983 | Gordon | 429/111 |
| 4,416,959 | 11/1983 | Skotheim | 429/111 |
| 4,442,185 | 4/1984 | Skotheim | 429/111 |
| 4,544,456 | 10/1985 | Skotheim | 205/414 |
| 4,637,969 | 1/1987 | Skotheim et al. | 429/111 |
| 4,916,035 | 4/1990 | Yamashita et al. | 429/111 |
| 5,053,293 | 10/1991 | Yamakita | 429/111 |

OTHER PUBLICATIONS

Gray, Fiona M., "Solid Polymer Electrolytes", VCH Publishers, Inc., 1991, New York, pp. 28 and 29.

*Primary Examiner*—Aaron Weisstuch
*Attorney, Agent, or Firm*—Gerald Swiss

[57] ABSTRACT

This invention is directed to a photoelectrochemical cell having increased conductivity. The cell employs an electrolyte formed from a polymeric matrix, an electrolytic solvent, an inorganic ion salt and a redox couple.

15 Claims, No Drawings

PHOTOELECTROCHEMICAL CELL

BACKGROUND OF THE INVENTION

1. Field of the Invention

This invention is directed to solid electrolytes containing a polymer matrix and an electrolyte solvent (plasticizer) for the polymer matrix. This invention is further directed to a photoelectrochemical cell employing the polymer matrix.

1. State of the Art

Photoelectrochemical cells are photovoltaic devices based on the junction of a semiconductor photoelectrode and an electrolyte containing a redox couple, such as $I^-/I_3^-/I_2$ or $S^{2-}/S^{2-}/S_{x+1}^{2-}$. These systems have heretofore generally employed n-type semiconductors and transparent electrodes. Illumination produces photogenerated holes that oxidize the complex anions in the electrolyte solution, while electrons travel from the semiconductor through an external load to reduce the species at the transparent illuminated surface. Rediffusion in the electrolyte of the species completes the electrochemical cycle.

Polymeric electrolytes such as polyethylene oxide (PEO) have been used in photoelectrochemical cells to eliminate corrosion and side reactions of the semiconductor/electrolyte interface which are commonly observed with conventional electrolyte solvents.

However, cells with PEO electrolytes have relatively low conductivity and hence low efficiency. See Gray, "Solid Polymer Electrolytes; Fundamentals and Technological Applications," VCH Publishers, 1991, pp 28–29.

There is thus a need in the art for an electrolyte for a photoelectrochemical cell having increased conductivity but retaining the resistance to corrosion and side reactions of PEO.

SUMMARY OF THE INVENTION

The present invention is directed, in part, to the discovery that the use of certain solid electrolytes in the manufacture of photoelectrochemical cells can enhance conductivity compared to known cells, particularly with respect to those cells using polyethylene oxide (PEO) electrolytes. In addition, the use of the solid electrolytes of the invention provides increased transparency which aids in photocell efficiency.

Accordingly, in a composition aspect, the present invention is directed to a photoelectrochemical cell which comprises: a current collector, a semiconductor secured on one side to the current collector, a single phase, solid solvent-containing electrolyte secured to the other side of the semiconductor, and a transparent electrode secured to the solid electrolyte on a side opposite from the semiconductor, wherein the solid electrolyte comprises a redox couple, a solid polymeric matrix, an inorganic ion salt, and an electrolytic solvent.

In one of its method aspects, the present invention is directed to a method for enhancing the conductivity of a photoelectrochemical cell which comprises incorporating in the cell the solid, single- phase, solvent-containing electrolyte described above.

DETAILED DESCRIPTION OF THE PREFERRED EMBODIMENTS

As noted above, this invention is directed to photoelectrochemical cells containing solid, solvent-containing electrolytes.

The solid electrolytes of the invention contain either an inorganic or an organic matrix and a suitable inorganic ion salt as a separate component. The inorganic matrix may be non-polymeric (e.g., β-alumina, silver oxide, lithium iodide, etc.) or polymeric (e.g., inorganic (polyphosphazene) polymers) whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, ethylene oxide, propylene oxide, ethyleneimine, epichlorohydrin, ethylene succinate, and an acryloyl-derivatized polyalkylene oxide containing an acryloyl group of the formula $CH_2=CR'C(O)O-$ where R' is hydrogen or lower alkyl of from 1–6 carbon atoms.

Because of their expense and difficulty in forming into a variety of shapes, inorganic non-polymeric matrices are generally not preferred, rather, a solid electrolyte containing a polymeric matrix is typically employed. In order to maximize the conductivity of solid electrolytes having a polymeric matrix, the latter is generally constructed into a very thin film, i.e., on the order of about 25 to about 250 μm. As is apparent, the reduced thickness of the film reduces the total amount of internal resistance within the electrolyte thereby minimizing losses in conductivity due to internal resistance.

The solid electrolytes also contain a solvent (plasticizer) which is added to the matrix primarily in order to enhance the solubility of the inorganic ion salt in the solid electrolyte and thereby increase the conductivity of the photoelectrochemical cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like.

The solid, solvent-containing electrolyte is typically formed by one of two methods. In one method, the solid matrix is first formed and then a requisite amount of this material is dissolved in a volatile solvent. Requisite amounts of the inorganic ion salt and the electrolyte solvent (usually a glyme and the organic carbonate) are then added to the solution. This solution is then placed on the surface of a suitable substrate (e.g., the surface of a semiconductor) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the semiconductor) and the monomer is polymerized or cured (or the partial polymer is then further polymerized or cured) by conventional techniques (heat, ultraviolet radiation, electron beams, etc.) so as to form the solid, solvent-containing electrolyte.

Prior to describing this invention in further detail, the following terms will first be defined.

Definitions

As used herein, the following terms have the following meanings.

The term "solid polymeric matrix" refers to an electrolyte compatible material formed by polymerizing an inorganic or organic monomer (or partial polymer thereof) and which, when used in combination with the other components of the electrolyte, renders the electrolyte solid. The solid matrix may or may not be ion-conducting.

Suitable solid polymeric matrices are well known in the art and include solid matrices formed from inorganic polymers, organic polymers or a mixture of organic polymers with inorganic non- polymeric materials. Preferably, the solid polymeric matrix is an organic matrix derived from a solid matrix forming monomer and/or from partial polymers of a solid matrix forming monomer.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of an inorganic ion salt, and an electrolytic solvent to form solid matrices which are suitable for use as solid electrolytes in photoelectrochemical cells. Suitable solid matrix forming monomers are well known in the art and the particular monomer employed is not critical. Preferably, the solid matrix forming monomers have at least one heteroatom capable of forming donor acceptor bonds with inorganic cations (e.g., alkali ions). When polymerized, such compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. Pat. No. 5,262,253, which patent is incorporated herein by reference in its entirety), and the like as well as mixtures thereof. Ethylene oxide is especially preferred in combination with acrylate end groups.

Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Syrup., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices which are suitable for use as solid electrolytes in photoelectrochemical cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, etc. The resulting cured product preferably contains repeating units containing at least one heteroatom such as oxygen or nitrogen which is capable of forming donor acceptor bonds with inorganic cations (e.g., alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the solvent. For example, a composition comprising requisite amounts of the solid matrix forming monomer, electrolyte solvent and inorganic ion salt can be applied to a substrate and then cured. Alternatively, the solid matrix forming monomer can be first cured and then dissolved into a suitable volatile solvent. Requisite amounts of the solvent and inorganic ion salt can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "inorganic ion salt" refers to any inorganic salt which is suitable for use in a solid electrolyte. Representative examples are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, etc. Specific examples of suitable inorganic ion salts include $LiClO_4$, $LiI$, $LiSCN$, $LiBF_4$, $LiAsF_6$, $LiCF_3SO_3$, $LiPF_6$, $NaI$, $NaSCN$, $KI$, and the like. The inorganic ion salt preferably contains at least one atom of Li, Na, K or Mg. The term "organic carbonate" refers to hydrocarbyl carbonate compounds of no more than about 12 carbon atoms and which do not contain any hydroxyl groups. Preferably, the organic carbonate is a linear aliphatic carbonate or a cyclic aliphatic carbonate.

In a more preferred embodiment, the carbonate is a cyclic aliphatic carbonate represented by the formula:

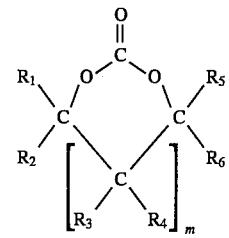

where each of $R_1$, $R_2$, $R_3$, $R_4$, $R_5$, and $R_6$ are independently selected from the group consisting of hydrogen and alkyl of 1 or 2 carbon atoms, and m is an integer equal to 0 or 1.

In a particularly preferred embodiment, m is equal to zero and $R_1$, $R_2$, and $R_5$ are hydrogen and $R_6$ is hydrogen (ethylene carbonate), —$CH_3$ (propylene carbonate) or —$CH_2CH_3$ (butylene carbonate).

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl- 1,3-dioxolan-2-one; 1,3-dioxan-2-one; 4,4-dimethyl-1,3-dioxan-2-one; 5,5-dimethyl-1,3-dioxan-2-one;

5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro[1,3-oxa-2-cyclohexanone-5',5',1',3'-oxa-2'-cyclohexanone].

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety.

Additional suitable cyclic aliphatic carbonates are disclosed in U.S. Pat. No. 4,747,850 which is also incorporated herein by reference in its entirety.

In a more preferred embodiment, linear aliphatic carbonates are represented by the formulae:

$$R_7[OC(O)]_tOR_8 \text{ and } R_7[OC(O)R_9]_uOC(O)R_8$$

where each $R_7$ and $R_8$ are independently selected from the group consisting of alkyl of from 1 to 4 carbon atoms; $R_9$ is an alkylene group of from 2 to 4 carbon atoms; t is an integer of 1 or 2, and u is an integer from 1 to 4.

Most preferably, the linear aliphatic carbonate is a carbonate of the formula:

$$R_7[OC(O)]_tOR_8$$

where $R_7$, $R_8$ and t are as defined above.

Linear aliphatic carbonates are well known in the art and a variety of which are commercially available. Additionally, the linear aliphatic carbonates can be prepared by transesterification of a suitable alcohol (e.g., $R_7OH$ or $R_8OH$) with, e.g., diethyl carbonate under transesterification conditions.

The term "glyme" refers to ethylene glycol dimethyl ether or $CH_3OCH_2CH_2OCH_3$. The term "a glyme" refers to glyme and also to diglyme, triglyme, tetraglyme, etc., which contain repeating units of $—(OCH_2CH_2)—$.

The term "photoelectrochemical cell" refers to a composite that comprises a current collector, a semiconductor, the solid electrolyte, and a transparent electrode.

The term "urethane acrylate" refers to urethane diacrylate.

Methodology

Methods for preparing solid, solvent-containing electrolytes are well known in the art. As noted above, various organic carbonates are either commercially available or can be prepared by art recognized methods. Preferably, the solvent includes a glyme.

The solid, solvent-containing electrolyte is preferably prepared by combining one or more solid matrix-forming monomers, and an inorganic ion salt. The resulting composition is then uniformly coated onto a suitable substrate (e.g., a semiconductor or transparent electrode) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns (μm). Preferably, the solid, solvent-containing electrolyte may have a thickness of from about 20 to about 250 microns. The final thickness will depend on the particular application.

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent.

The electrolyte composition typically comprises from about 40 to about 80 weight percent solvent (e.g., organic carbonate/glyme mixture) based on the total weight of the electrolyte; preferably from about 60 to about 80 weight percent; and even more preferably, about 70 weight percent.

The solid electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. The polyethylene oxide or polypropylene oxide film forming agent, if present, is in an amount which does not significantly lower the conductivity of the electrolyte. Preferably, the film forming agent is employed in an amount of .about 1 to about 10 weight percent and more preferably at about 2.5 weight percent based on the total weight of the electrolyte composition.

The composition is cured by conventional methods to form a solid film. For example, when the solid matrix forming monomer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like. When curing is by UV radiation, the initiator is typically benzophenone, Darocur 1173 (Geigy, Ardsley, New York), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

The resulting solid electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the photoelectrochemical cell. For example, most of the protic inhibitors in mono-, di-, tri- and higher functional acrylate monomers as well as in the urethane acrylate prepolymers, are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming a photoelectrochemical cell comprises the steps of securing a semiconductor to a current collector. Thereafter, a composition comprising at least one solid matrix forming monomer, an inorganic ion salt and the solvent, for example, a mixture of an organic carbonate and a glyme compound, is applied to the opposite side of the semiconductor. The composition is then cured to provide for a solid electrolyte on the semiconductor surface. A transparent electrode is then laminated to this composite product in such a way that the solid electrolyte is interposed between the transparent electrode and the semiconductor.

This process can be reversed, so that the surface of the transparent electrode is coated with a composition comprising a solid matrix forming monomer, the solvent or solvent mixture and an inorganic salt. The composition is then cured to provide for a solid electrolyte on the electrode surface. The semiconductor and current collector are then laminated to this composite product in such a way that the solid electrolyte is interposed between the transparent electrode and the semiconductor.

Methods for preparing solid electrolytes are also set forth in U.S. Pat. Nos. 4,830,939 and 4,925,751 which are incorporated herein by reference in their entirety.

Utility

The solid, solvent-containing electrolytes described herein are particularly useful in preparing solid photoelectrochemical cells.

The cells of the invention have increased conductivity compared with photoelectrochemical cells of the prior art using polyethylene oxide electrolyte.

The following examples are offered to illustrate the present invention and should not be construed in any way as limiting its scope.

EXAMPLE 1

A. Semiconductor

An n-type semiconductor available from Cerac, Milwaukee, Wis. is used in making the cell.

B. Electrolyte

The electrolyte may be prepared by first combining 56.51 grams of propylene carbonate, 14.13 grams triglyme and 17.56 grams of urethane acrylate (available as Photomer 6140 from Henkel Corporation, Coating and Chemicals Division, Ambler, Pa.). The propylene carbonate/triglyme/urethane acrylate mixture is dried over molecular sieves (Grade 514, 4 Å, 8–12 mesh, available from W. R. Grace, Baltimore, Md.) to remove water.

This solution is then combined with 2.56 grams of polyethylene oxide (weight average molecular weight about 600,000 available as Polyox WSR-205 from Union Carbide Chemicals and Plastics, Danbury, Conn.). The resulting mixture is thoroughly mixed with the same laboratory mixer at heating until a temperature of about 65° C. is reached and then cooled to ambient temperature over at least a 2 hour period while stirring is maintained.

Once the polyethylene oxide is dispersed and dissolved, 9.24 grams of $LiAsF_6$ (available from FMC Corporation Lithium Division, Bessemer City, N.C., as Lectrosalt®) and are added while stirring with a laboratory mixer (Yamato Model LR41B, available from Fisher Scientific, Santa Clara, Calif.). A redox couple consisting of 1.0 g LiI and 0.1 g $I_2$ are then added.

The resulting 100 gram mixture would contain the following weight percent of components:

| | |
|---|---|
| Propylene carbonate | 56.51 weight percent |
| Triglyme | 14.13 weight percent |
| Urethane acrylate (Photomer 6140) | 16.46 weight percent |
| $LiAsF_6$ | 9.24 weight percent |
| Polyethylene oxide | 2.56 weight percent |
| LiI | 1.0 g weight percent |
| $I_2$ | 0.1 g weight percent |

Afterwards, the electrolyte mixture is then coated by a conventional knife blade to a thickness of about 50 μm onto the surface of the cathode/semiconductor sheet prepared as above (on the side having the semiconductor) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contains a solid electrolyte laminated to semiconductor which, in turn, is laminated to a nickel on nickel current collector.

An alternative method of fabricating the electrolyte is as follows:

35.71 grams of propylene carbonate, 3.45 grams of trimethyl propyl triacrylate, 35.71 grams of ethylene carbonate, and 13.79 grams of urethane acrylate (Actilane SP023, available from Akcros Chemicals, Ltd., Manchester, England) are combined at room temperature until homogeneous. The resulting solution is optionally passed through a column of 4 A molecular sieves to remove water and then the recovered solution is mixed at room temperature until homogeneous. If necessary, the ethylene carbonate can first be dissolved in propylene carbonate with heat.

At this point, 1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 8.77 grams of $LiPF_6$ are added to the solution over a 120 minute period while thoroughly mixing to ensure a substantially uniform temperature profile throughout the solution. A redox couple consisting of 1.0 grams LiI and 0.1 grams $I_2$ are also added. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following (in approximate weight percent based on the total weight of the electrolyte solution (100 g):

| | |
|---|---|
| Propylene Carbonate | 35.71% |
| Ethylene Carbonate | 35.71% |
| Trimethylol propyl triacrylate (TMPTA) | 3.45% |
| Urethane Acrylate | 13.79% |
| $LiPF_6$ | 8.77% |
| PEO Film Forming Agent | 1.47% |
| LiI | 1.00% |
| $I_2$ | 0.10% |
| Total | 100% |

This solution is then degassed to provide for an electrolyte solution wherein little, if any,, of the $LiPF_6$ salt decomposes.

Optionally, the above solution which contains the prepolymer, the film forming agent, the electrolytic solvent, the $LiPF_6$ salt and the redox couple, is filtered to remove any solid particles or gels remaining in the solution. One suitable filter device is a sintered stainless steel screen having a pore size between 1 and 50 μm at 100% efficiency.

In an alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and ethylene carbonate and dry the solution over 4 A molecular sieves (Grade 514, 8–12 Mesh from Schools Inc., Moraga, Calif.) and then proceed to step 4.

2. Dry the propylene carbonate and ethylene carbonate over 4 A molecular sieves (Grade 514, 8–12 Mesh from Schoofs Inc., Moraga, Calif.).

3. At room temperature, <30° C., add the urethane acrylate to the solvent prepared in step 2. Stir until the resin is completely dissolved. The solution should be clear and colorless.

4. Dry and optionally sift the polyethylene oxide film forming agent through a 25 mesh mini-sieve commercially available as Order No. 57333-965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature (<30° C.).

5. After final addition of the polyethylene oxide film forming agent, stir to ensure that the film forming agent is substantially dispersed.

6. Heat the mixture to 68° to 75° C. and stir until the film forming agent has melted and the solution has become transparent. Optionally, in this step, the mixture is heated to 65° to 68° C.

7. Cool the solution produced in step 6 and when the temperature of the solution reaches 40° C., add the $LiPF_6$ salt and redox couple very slowly making sure that the maximum temperature does not exceed 55° C. and preferably does not exceed about 40° C.

8. Following the addition of the $LiPF_6$ salt and redox couple, the solution is stirred and degassed. The electrolyte solution is allowed to cool before usage.

9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

C. The Photoelectrochemical Cell

The photoelectrochemical cell is prepared by applying the n-type semiconductor onto one side of a current collector. An electrolyte composition as described above is then placed onto the other side of the semiconductor and cured to provide for the solid electrolyte. Then, an indium tin oxide (ITO) transparent electrode is laminated onto the solid electrolyte to provide for the photoelectrochemical cell. The ITO transparent electrode is formed by coating ITO by vacuum deposition onto a piece of glass. A protective layer of glass is then secured over the transparent electrode.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A photoelectrochemical cell which comprises:

a current collector;

a semiconductor secured on one side to the current collector;

a transparent single phase, solid solvent-containing electrolyte secured to the other side of the semiconductor; and a transparent electrode secured to the solid electrolyte on a side opposite from the semiconductor;

wherein the solid electrolyte comprises a redox couple, a solid, polymeric matrix, an inorganic ion salt, and a non-aqueous electrolytic solvent.

2. A cell as in claim 1, wherein the polymeric matrix comprises ethylene oxide in combination with acrylate groups.

3. A cell as in claim 1, wherein the transparent electrode comprises indium tin oxide.

4. A cell as in claim 1, wherein the inorganic ion salt is selected from the group consisting of $LiClO_4$, LiI, LiSCN, $LiBF_4$, $LiAsF_6$, $LiCF_3SO_3$, and $LiPF_6$.

5. A cell as in claim 1, wherein the non-aqueous electrolytic solvent comprises an organic carbonate and a glyme.

6. A cell as in claim 1 wherein the non-aqueous electrolytic solvent is selected from the group consisting of propylene carbonate, ethylene carbonate, γ-butyrolactone, tetrahydrofuran, glyme, diglyme, triglyme, tetraglyme, dimethylsulfoxide, dioxolane, and sulfolane.

7. A cell as in claim 1 wherein the redox couple comprises LiI and $I_2$.

8. A method of fabricating a photoelectrochemical cell which comprises of the steps of:

providing a current collector;

securing a semiconductor on one side to the current collector;

providing a transparent electrode; and forming a transparent single phase, solid solvent-containing electrolyte by coating either (1) the other side of the semiconductor or (2) a side of the transparent electrode with a composition containing a non-aqueous electrolytic solvent and at least one solid matrix-forming monomer and curing the composition to form the transparent solid solvent-containing electrolyte that is positioned between the semiconductor and the transparent electrode, wherein the solid electrolyte further comprises a redox couple and an inorganic ion salt.

9. A method as in claim 8, wherein the polymeric matrix comprises ethylene oxide in combination with acrylate groups.

10. A method as in claim 8, wherein the at least one solid matrix-forming monomer is selected from the group consisting of propylene oxide, ethyleneimine, epichlorohydrin, ethylene succinate, and an acryloyl-derivativized polyalkylene oxide containing an acryloyl group of the formula $CH_2=CR'C(O)O-$ wherein R' is hydrogen or lower alkyl of from 1–6 carbon atoms.

11. A method as in claim 8, Wherein the transparent electrode comprises indium tin oxide.

12. A method as in claim 8, wherein the inorganic ion salt is selected from the group consisting of $LiClO_4$, LiI, LiSCN, $LiBF_4$, $LiAsF_6$, $LiCF_3SO_3$, and $LiPF_6$.

13. A method as in claim 8, wherein the electrolyte solvent comprises an organic carbonate and a glyme.

14. A method as in claim 8, wherein the non-aqueous electrolytic solvent is selected from the group consisting of propylene carbonate, ethylene carbonate, γ-butyrolactone, tetrahydrofuran, glyme, diglyme, triglyme, tetraglyme, dimethylsulfoxide, dioxolane, and sulfolane.

15. A method as in claim 8 wherein the redox couple comprises LiI and $I_2$.

* * * * *